(12) United States Patent
Fu et al.

(10) Patent No.: US 10,271,238 B2
(45) Date of Patent: Apr. 23, 2019

(54) METHOD AND DEVICE FOR TRANSMITTING IP DATA PACKET

(71) Applicant: China Academy of Telecommunications Technology, Beijing (CN)

(72) Inventors: Jing Fu, Beijing (CN); Li Chen, Beijing (CN); Fei Qin, Beijing (CN); Ming Al, Beijing (CN); Yunjing Hou, Beijing (CN); Fei He, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 387 days.

(21) Appl. No.: 14/383,104

(22) PCT Filed: Mar. 4, 2013

(86) PCT No.: PCT/CN2013/072140
§ 371 (c)(1),
(2) Date: Sep. 4, 2014

(87) PCT Pub. No.: WO2013/131458
PCT Pub. Date: Sep. 12, 2013

(65) Prior Publication Data
US 2015/0071059 A1    Mar. 12, 2015

(30) Foreign Application Priority Data
Mar. 5, 2012 (CN) .......................... 2012 1 0055090

(51) Int. Cl.
*H04W 28/02* (2009.01)
*H04W 72/08* (2009.01)
(Continued)

(52) U.S. Cl.
CPC ..... *H04W 28/0205* (2013.01); *H04L 47/2408* (2013.01); *H04L 67/322* (2013.01);
(Continued)

(58) Field of Classification Search
CPC ............. H04W 72/08; H04W 28/0205; H04W 28/0263; H04L 67/322; H04L 47/2408
See application file for complete search history.

(56) References Cited

U.S. PATENT DOCUMENTS

| | | | |
|---|---|---|---|
| 8,514,756 B1 * | 8/2013 | Ramachandra | H04L 61/2069 370/310 |
| 2010/0067489 A1 * | 3/2010 | Pelletier | H04W 48/17 370/331 |

(Continued)

FOREIGN PATENT DOCUMENTS

| | | |
|---|---|---|
| CN | 1992671 A | 7/2007 |
| CN | 102238743 A | 11/2011 |

(Continued)

OTHER PUBLICATIONS

Office Action dated Feb. 3, 2015 in a Japanese corresponding application (JP2014-523186).

(Continued)

*Primary Examiner* — Hassan Kizou
*Assistant Examiner* — Abdullahi Ahmed
(74) *Attorney, Agent, or Firm* — Kilpatrick Townsend & Stockton LLP

(57) ABSTRACT

A method and device for transmitting Internet Protocol (IP) data packet are disclosed by the present invention, the method comprising: an Access Point (AP) device obtains an IP data packet needing to be sent to an User Equipment (UE); said AP device use the type information of said IP data packet to determine the corresponding Data Radio Bearer (DBR) of said IP data packet; Said AP device sends said IP (Continued)

data packet to said UE through said DBR; in the embodiments of the present invention, when the AP device accesses the IP network locally or directly through the IP network, the Quality of Service (QoS) insurance of IP data packet in the air interface transmission is implemented, on the basis of the direct mapping between the type information and the data radio bearer.

14 Claims, 5 Drawing Sheets

(51) Int. Cl.
*H04W 72/02* (2009.01)
*H04W 76/00* (2018.01)
*H04L 12/851* (2013.01)
*H04L 29/08* (2006.01)
*H04W 88/02* (2009.01)
*H04W 88/08* (2009.01)
*H04W 80/04* (2009.01)

(52) U.S. Cl.
CPC ....... *H04W 28/0263* (2013.01); *H04W 72/02* (2013.01); *H04W 72/08* (2013.01); *H04W 76/00* (2013.01); *H04W 80/04* (2013.01); *H04W 88/02* (2013.01); *H04W 88/08* (2013.01)

(56) References Cited

U.S. PATENT DOCUMENTS

| | | | | |
|---|---|---|---|---|
| 2012/0250603 A1* | 10/2012 | Huang | .............. | H04W 72/1257 370/315 |
| 2012/0281566 A1* | 11/2012 | Pelletier | .............. | H04W 76/046 370/252 |
| 2013/0170350 A1* | 7/2013 | Sarkar | .............. | H04W 28/24 370/235 |
| 2013/0242859 A1* | 9/2013 | Celik | .............. | H04L 47/34 370/328 |

FOREIGN PATENT DOCUMENTS

| | | | |
|---|---|---|---|
| CN | 102612095 A | 7/2012 | |
| CN | 102612096 A | 7/2012 | |
| EP | 1 988 512 A1 | 12/2008 | |
| EP | 1998512 A1 * | 12/2008 | ............ H04W 28/10 |
| EP | 2 136 529 A1 | 12/2009 | |
| EP | 2 437 564 A1 | 4/2012 | |
| JP | 2012235352 A | 11/2012 | |
| WO | 2008018993 A1 | 2/2008 | |
| WO | 2010/145556 A1 | 12/2010 | |
| WO | 2010/148915 A1 | 12/2010 | |
| WO | 2011/015331 A1 | 2/2011 | |
| WO | 2011/040751 A1 | 4/2011 | |
| WO | 2011/085270 A1 | 7/2011 | |

OTHER PUBLICATIONS

Nokia Siemens Networks, Nokia, Cell aggregation: A unified approach to CoMP and carrier aggregation, 3GPP TSG-RAN WG1 Meeting #65 R1-111737, May 3, 2011.
Panasonic, Summary of email discussion: Aperiodic CQI Triggering in common search space, 3GPP TSG-RAN WG1 Meeting 63bis R1-110198, Jan. 31, 2011.
International Search Report for PCT/CN2013/072140.
Extended European Search Report dated Jan. 29, 2015, received in the EP counterpart application (EP 13758599.8), 7 pages.

* cited by examiner

METHOD AND DEVICE FOR TRANSMITTING IP DATA PACKET

This application is a U.S. National Stage of International Application No. PCT/CN2013/072140, filed on Mar. 4, 2013, designating the United States and claiming priority to Chinese Patent Application No. 201210055090.5, filed with the Chinese Patent Office on Mar. 5, 2012 and entitled "Method and device for transmitting IP data packet", the content of which is hereby incorporated by reference in its entirety.

FIELD

The present invention relates to the field of communications and particularly to a method and device for transmitting an IP data packet.

BACKGROUND

I. Internet Protocol (IP) Service Priority

In an IPv4 header, there are 8 bits for representing a Type of Service (ToS), for 15 example, in a schematic diagram of the IPv4 header illustrated in FIG. 1 and a schematic diagram of the ToS field illustrated in FIG. 2; the first three bits in the ToS field represent an IP priority, which defines 8 values depicted in Table 1; and there are further a 4-bit ToS and 1 reserved bit in the ToS field, where the 4-bit ToS represents the lowest delay D, the highest throughput T, the highest reliability R and the lowest cost C.

TABLE 1

| IP priority value | IP priority name |
|---|---|
| 000 | Routine |
| 001 | Priority |
| 010 | Immediate |
| 011 | Flash |
| 100 | Flash Override |
| 101 | Critic |
| 110 | Internetwork Control |
| 111 | Network Control |

As illustrated in FIG. 3 which is a schematic diagram of an IPv6 header, the IPv6 header includes two fields related to a Quality of Service (QoS), which are a Traffic Class (TC) and a Flow Label (FL), where the Traffic Class field is 8-bit, the function of which is the same as that of the Type of Service field in the IPv4 header, for identifying a traffic class; and the 20-bit Flow Label field identifies packets of the same traffic flow.

II. Evolved Packet System (EPS) Bearer Mapping Mechanism

A Policy Control and Charging (PCC) architecture maps a required QoS of a session service data flow at the application level to a required QoS for an access of an IP-Connectivity Access Network (IP-CAN) to a bearer-level service of a transport network to guarantee data transmission; and this is functionally embodied on an Application Function (AF), a Policy and Charging Rule Function (PCRF), a Policy and Charging Enforcement Function (PCEF) or a Bearer Binding and Event Report Function (BBERF) and a User Equipment (UE).

Particularly the AF transmits traffic information of media-plane parameters to the PCRF via an Rx interface in the form of signaling of an AF session; the PCRF maps the traffic information to authorized IP QoS parameters according to an operator policy, user subscription information, etc.; the PCRF issues a corresponding QoS policy to the PCEF of a Packet Data Network-Gateway (PDN-GW); the PCEF binds a bearer according to a PCC rule and maps these parameters to QoS parameters of the particular access via a Gx or Gxx interface, e.g., QoS parameters of the EPS bearer (e.g., a QoS Class Identifier (QCI), a Guaranteed Bit Rate (GBR), a Maximum Bit Rate (MBR), etc.).

Moreover the EPS bearer is the granularity, in which an Evolved Packet Core (EPC)/Evolved-Universal Terrestrial Radio Access Network (E-UTRAN) performs the QoS control, to enforce the same bearer-level packet forwarding strategy for traffic mapped to the same EPS bearer; an EPS bearer needs to traverse different network elements and interfaces and is mapped to a different underlying bearer on each of the interfaces; the respective network nodes are responsible for maintaining the identifiers of underlying bearers and their mutual binding relationship, where an eNodeB (i.e., a base station) creates binding between a radio bearer and an S1 bearer for mapping between the radio bearer and the S1 interface, and a Serving-Gateway (S-GW) creates binding between the S1 bearer and an S5/S8 bearer for mapping between the S1 bearer and the S5/S8 bearer; and finally data of the EPS bearer is concatenated over the radio bearer, the S1 bearer and the S5/S8 bearer to support connectivity traffic between the UE and a Packet Data Network (PDN) so as to guarantee the required QoS.

Each EPS bearer is associated with a so-called data packet Traffic Flow Template (TFT), where the TFT includes an uplink TFT and a downlink TFT respectively located at the UE side and the Gateway (GW). The TFT includes packet filter information, typically 5-tuple information including source and destination IP addresses, source and destination port numbers and a protocol number. A traffic data flow is mapped onto a corresponding EPS bearer by the GW or the UE side according to the packet filter information for the purpose of binding between the data flow and the EPS bearer.

III. Local IP Access Network Architecture

As illustrated in FIG. 4, in order to lower a cost at the network side and avoid congestion at the network side, an implementation at the network side relates to a direct access of the base station (or through the IP gateway) to the IP network, and in this architecture, the base station is the Access Point (AP); and unlike the traditional IP network, transmission of the base station to the UE is performed via an air interface by the base station transmitting an IP data packet to the UE via the air interface while guaranteeing the QoS required for the IP data packet via the air interface.

The inventors have identified during making of the invention at least the following problems in the prior art:

There has been absent in the prior art of a solution to direct mapping of a QoS required for an IP data packet to an air interface bearer, thus failing to satisfy the demand for transmission of the IP data packet.

SUMMARY

An embodiment of the invention provides a method and device for transmitting an IP data packet so as to map a QoS, required for the IP data packet, directly to a data radio bearer to thereby guarantee the QoS.

In order to achieve the object above, an embodiment of the invention provides a method for transmitting an Internet Protocol, IP, data packet, the method including:

obtaining, by an Access Point, AP, device, an IP data packet to be transmitted to a User Equipment, UE;

determining, by the AP device, a Data Radio Bearer, DRB, corresponding to the IP data packet from type information of the IP data packet; and transmitting, by the AP device, the IP data packet to the UE over the DRB.

An embodiment of the invention provides a method for transmitting an Internet Protocol, IP, data packet, the method including:

obtaining, by a User Equipment, UE, an IP data packet to be transmitted to an Access Point, AP, device;

determining, by the UE, a Data Radio Bearer, DRB, corresponding to the IP data packet from type information of the IP data packet; and transmitting, by the UE, the IP data packet to the AP device over the DRB.

An embodiment of the invention provides an Access Point, AP, device including:

an obtainment module configured to obtain an IP data packet to be transmitted to a UE;

a determination module configured to determine a Data Radio Bearer, DRB, corresponding to the IP data packet from type information of the IP data packet; and a transmission module configured to transmit the IP data packet to the UE over the DRB.

An embodiment of the invention provides a User Equipment, UE, including:

an obtainment module configured to obtain an IP data packet to be transmitted to an Access Point, AP, device;

a determination module configured to determine a Data Radio Bearer, DRB, corresponding to the IP data packet from type information of the IP data packet; and a transmission module configured to transmit the IP data packet to the AP device over the DRB.

The embodiments of the invention have at least the following advantages over the prior art: the QoS of the IP data packet transmitted via the air interface can be guaranteed by direct mapping between the type information and the data radio bearer in the case of a direct access of the AP locally or through the IP gateway to the IP network in the embodiments of the invention.

DETAILED DESCRIPTION OF THE EMBODIMENTS

First Embodiment

Figure 1:
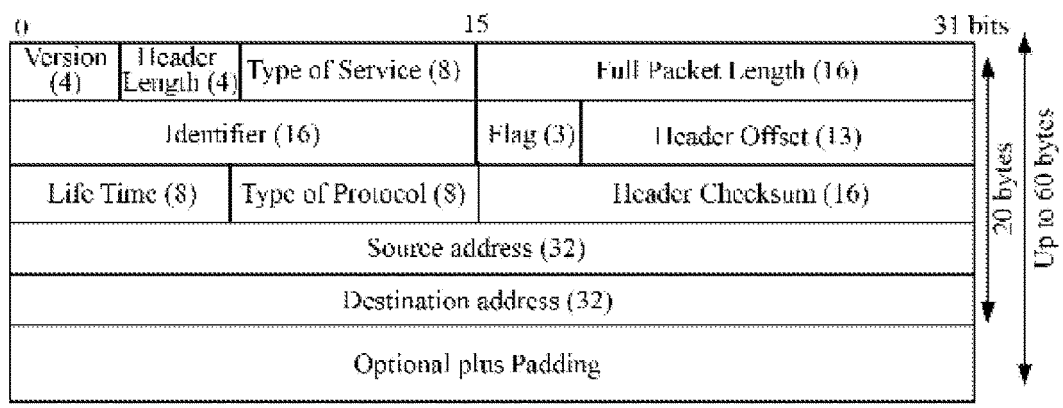
FIG. 1 is a schematic diagram of the IPv4 header in the prior art.
Figure 2:
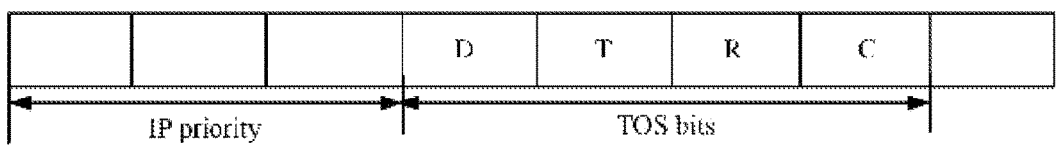
FIG. 2 is a schematic diagram of the ToS field in the prior art.
Figure 3:
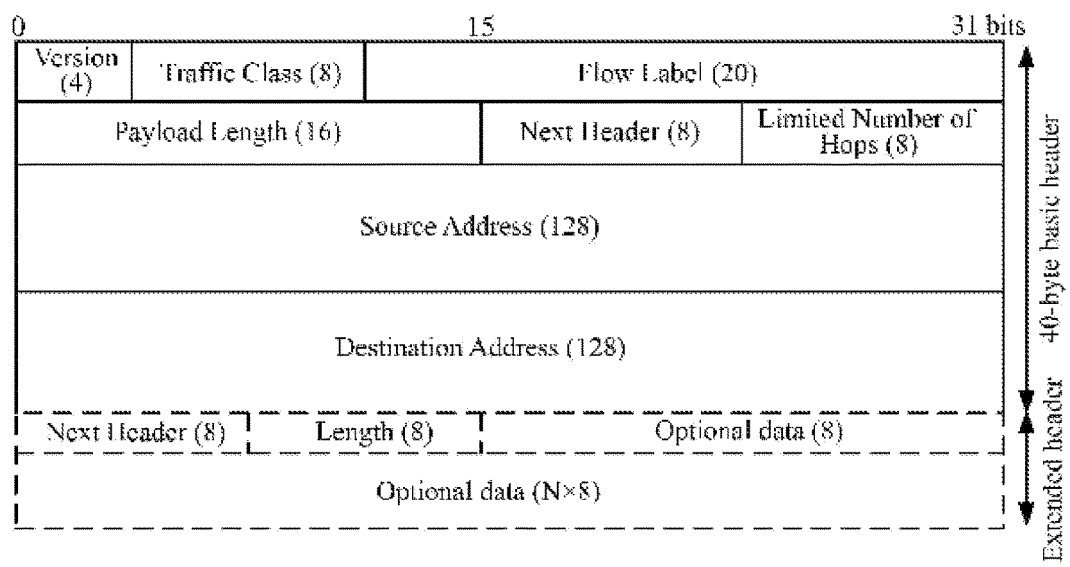
FIG. 3 is a schematic diagram of the IPv6 header in the prior art.
Figure 4:
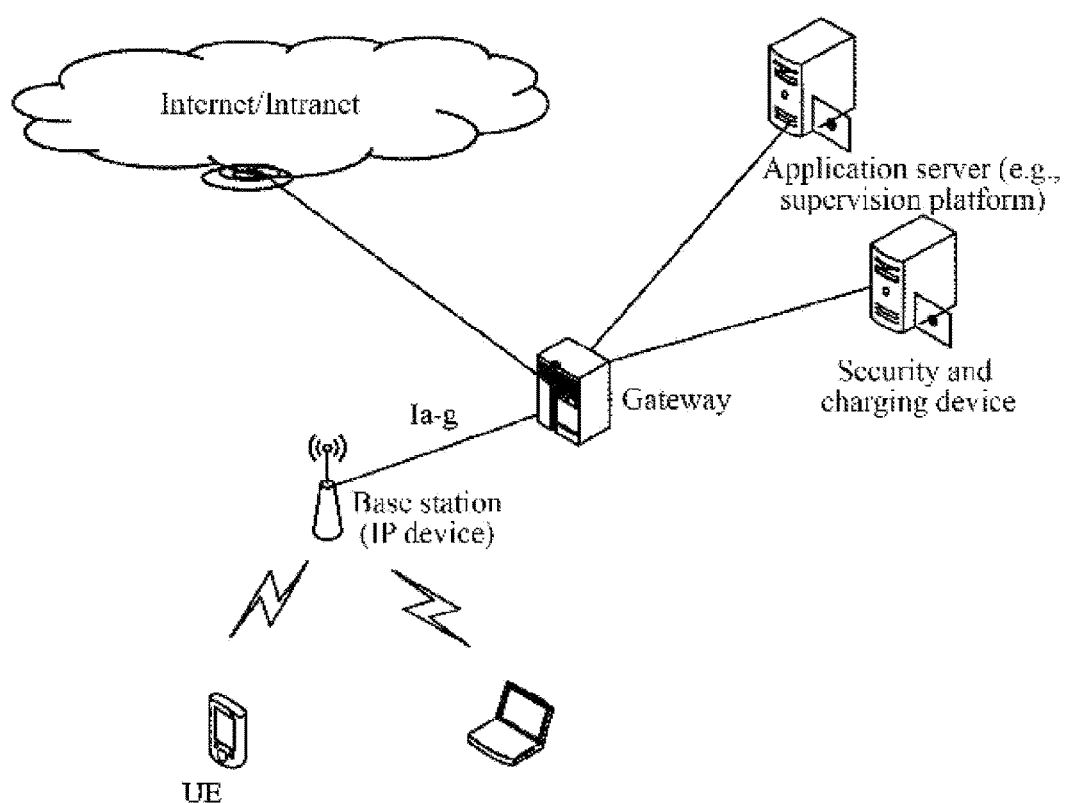
FIG. 4 is a schematic diagram of a direct access of the base station (or through the IP gateway) to the IP network in the prior art.
Figure 5A:
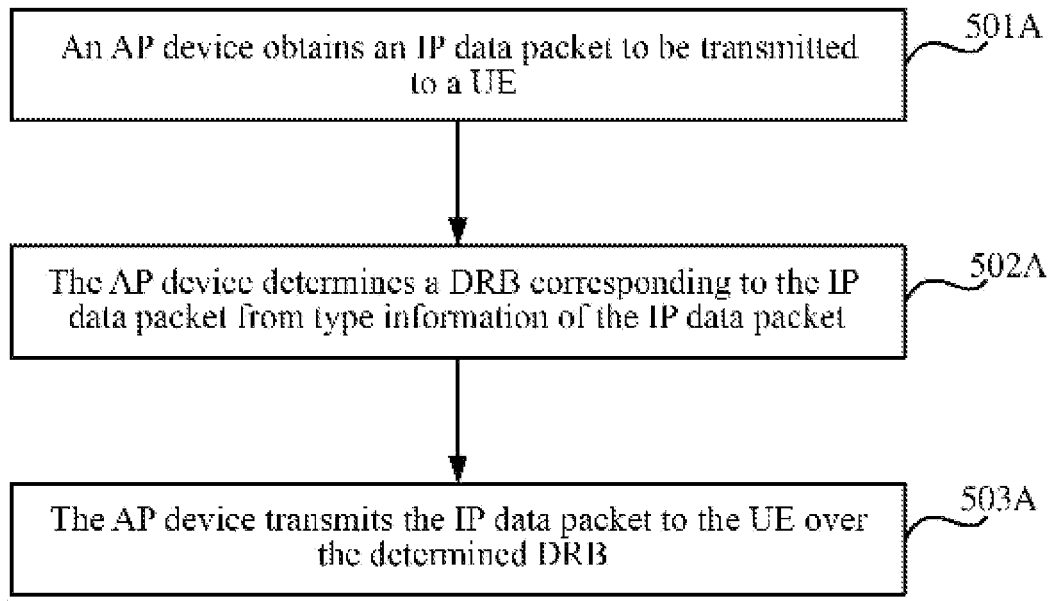
FIG. 5A and FIG. 5B are schematic flow charts of a method for transmitting an IP data packet according to a first embodiment of the invention.

The first embodiment of the invention provides a method for transmitting an IP data packet, where an AP device is connected directly with an IP network by an IP interface (or through an IP gateway) and transmits an IP data packet with a UE via an air interface (that is, the AP device transmits an IP data packet to the UE via the air interface and the UE transmits an IP data packet to the AP device via the air interface); and in order to guarantee a QoS required for the IP data packet via the air interface, as illustrated in FIG. 5A, the method in a flow of processing at the AP device side includes the following steps:

In the step 501A, an AP device obtains an IP data packet to be transmitted to a UE, where the AP device can receive, from an IP network, the IP data packet to be transmitted to the UE.

In the step 502A, the AP device determines, from type information of the IP data packet, a Data Radio Bearer (DRB) corresponding to the IP data packet.

In an embodiment of the invention, the type information includes but will not be limited to: a type of service carried in a header of an IPv4 data packet (8 bits in the IPv4 header to represent a Type of Service (ToS)); or a traffic class carried in a header of an IPv6 data packet (8 bits in the IPv6 header to represent a Traffic Class (TC)); or a protocol type, a source port number and a destination port number in the IPv4 data packet; or a next header, a source port number and a destination port number in the IPv6 data packet.

Particularly the AP device needs to be provided with an IP parsing function and can parse the IP data packet for the header and obtain the type information (the type of service or the traffic class) of the IP data packet from the header of the IP data packet and further categorize the IP data packet by the type of service or the traffic class and map a result of categorization to a different data air interface bearer (i.e., DRB) to according to the attribute of the categorized IP data packet.

In an embodiment of the invention, the AP device determines the DRB corresponding to the IP data packet according to the type information of the IP data packet particularly as follows: the AP device inquires about a DRB identifier corresponding to the type information of the IP data packet from a pre-maintained correspondence relationship between type information and a DRB identifier and determines the DRB corresponding to the IP data packet by the DRB identifier.

Particularly since each DRB corresponds to a unique DRB identifier, the DRB corresponding to the IP data packet can be determined finally from the maintained correspondence relationship between type information and a DRB identifier. For example, there is a correspondence relationship between type information 1 and a DRB identifier 1, and if the type information 1 is obtained from the IP data packet, then it can be determined that the DRB over which the IP data packet needs to be transmitted is a DRB corresponding to the DRB identifier 1.

In the step 503A, the AP device transmits the IP data packet to the UE over the determined DRB, and subsequent reception and processing by the UE will be omitted here in the embodiment of the invention.

In summary, given the correspondence relationship between type information and a DRB identifier, after obtaining the IP data packet to be transmitted to the UE, the AP device can know which DRB onto which the IP data packet shall be put for transmission to thereby guarantee the QoS required for the IP data packet.

Figure 5B:
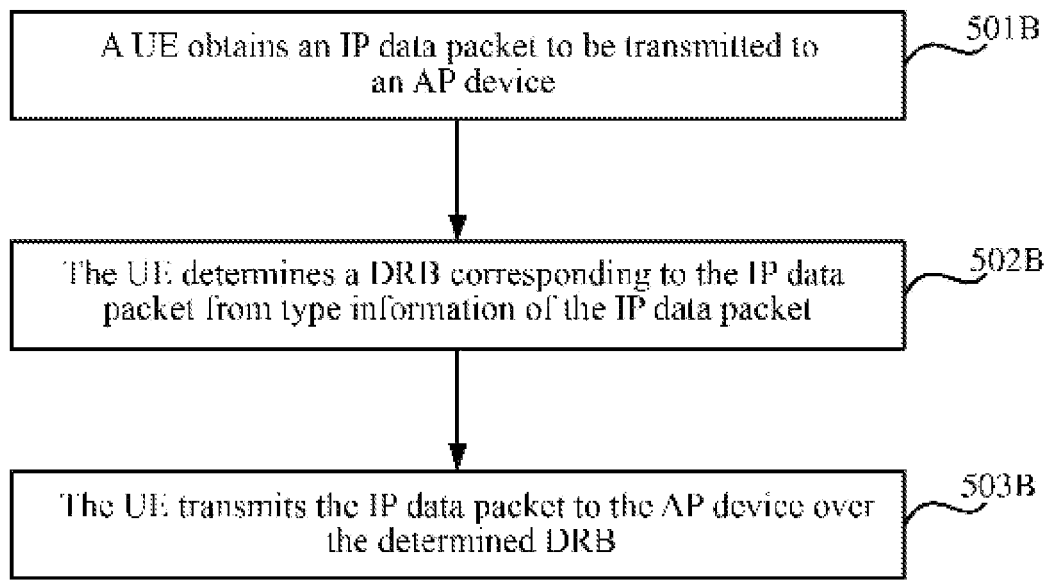

It shall be noted that FIG. 5A above illustrates the flow of processing at the AP device side, and in order to ensure a QoS required for an IP data packet via an air interface, as illustrated in FIG. 5B, the method in a flow of processing at the UE side can include the following steps:

In the step 501B, a UE obtains an IP data packet to be transmitted to an AP device, where the UE needing to transmit an IP data packet to the AP device can obtain by itself the IP data packet to be transmitted to the AP device.

In the step 502B, the UE determines, from type information of the IP data packet, a DRB corresponding to the IP data packet, where the type information includes but will not be limited to: a type of service carried in a header of an IPv4 data packet; or a traffic class carried in a header of an IPv6 data packet; or a protocol type, a source port number and a destination port number in the IPv4 data packet; or a next header, a source port number and a destination port number in the IPv6 data packet.

In an embodiment of the invention, the UE determines the DRB corresponding to the IP data packet according to the type information of the IP data packet particularly as follows: the UE inquires about a DRB identifier corresponding to the type information of the IP data packet from a pre-maintained correspondence relationship between type information and a DRB identifier and determines the DRB corresponding to the IP data packet by the DRB identifier.

Particularly since each DRB corresponds to a unique DRB identifier, the DRB corresponding to the IP data packet can be determined finally from the maintained correspondence relationship between type information and a DRB identifier. For example, there is a correspondence relationship between type information 1 and a DRB identifier 1, and if the type information 1 is obtained from the IP data packet, then it can be determined that the DRB over which the IP data packet needs to be transmitted is a DRB corresponding to the DRB identifier 1.

In the step 503B, the UE transmits the IP data packet to the AP device over the determined DRB, and subsequent reception and processing by the AP device will be omitted here in the embodiment of the invention.

In summary, given the correspondence relationship between type information and a DRB identifier, the UE obtaining the IP data packet to be transmitted to the AP device can know which DRB onto which the IP data packet shall be put for transmission to thereby guarantee the QoS required for the IP data packet.

In order to perform the process above, both the AP device and the UE need to maintain the correspondence relationship between type information and a DRB identifier, and in order to maintain the correspondence relationship between type information and a DRB identifier:

In a first implementation, the AP device obtains and maintains the correspondence relationship between type information and a DRB identifier and notifies the UE of the correspondence relationship between type information and a DRB identifier, and the UE obtains and maintains the correspondence relationship between type information and a DRB identifier.

(1) The AP device obtains the correspondence relationship between type information and a DRB identifier particularly as follows: in the step 1, the AP device obtains the correspondence relationship between type information and a DRB identifier; in the step 2, when the UE is connected to the AP device, the AP device sets up the DRB for the UE using a DRB configuration, determines a DRB identifier corresponding to the setup DRB and determines a correspondence relationship between a DRB configuration and a DRB identifier; and in the step 3, the AP device determines the correspondence relationship between type information and a DRB identifier from a correspondence relationship between type information and a DRB configuration and the correspondence relationship between a DRB configuration and a DRB identifier.

In an embodiment of the invention, the type information particularly includes but will not be limited to a Type of Service (ToS) or a Traffic Class (TC); or a protocol type, a source port number and a destination port number in an IPv4 data packet; or a next header, a source port number and a destination port number in an IPv6 data packet. The DRB configuration includes but will not be limited to a logical channel configuration, e.g., a logical channel priority; a Packet Data Convergence Protocol (PDCP), e.g., a Discard Timer; a Radio Link Control (RLC) protocol, e.g., an unacknowledgement mode (UM), an acknowledgement mode (AM), etc.; and the DRB needs to be distinguished by a DRBi (i.e., a DRB identifier).

In the step 1, the AP device obtains the correspondence relationship between type information and a DRB identifier particularly as follows: the AP device obtains the correspondence relationship between type information and a DRB identifier from an Operation Administration and Maintenance (OAM) entity; or the AP device obtains the correspondence relationship between type information and a DRB identifier in a predefined manner (for example, specifies the correspondence relationship between type information and a DRB identifier directly in the protocol).

Particularly in order to determine the correspondence relationship between type information and a DRB configuration, the correspondence relationship between type information and a DRB configuration can be determined based upon an IP priority in the type information and the logical channel priority in the DRB configuration; or the correspondence relationship between type information and a DRB configuration can be determined based upon the IP priority in the type information, ToS bit information in the type information (e.g., the lowest delay D, the highest throughput T, the highest reliability R, etc.) and the logical channel priority in the DRB configuration. Of course a practical application will not be limited to these two schemes as long as the correspondence relationship between type information and a DRB configuration can be determined based upon the 8-bit information in the Type of Service (ToS) or the Traffic Class (TC).

Moreover alternatively the correspondence relationship between type information and a DRB configuration can be determined based upon the protocol type, the source port number and the destination port number in the type information and the logical channel priority in the DRB configuration; or the correspondence relationship between type information and a DRB configuration can be determined based upon the next header, the source port number and the destination port number in the type information and the logical channel priority in the DRB configuration.

In the case that the correspondence relationship between type information and a DRB configuration is determined based upon the IP priority in the type information and the logical channel priority in the DRB configuration, taking the IPv4 as an example, the type information is a Type of Service (ToS), and there are 3 bits in the Type of Service (ToS) for representing an IP priority, a correspondence relationship between type information and a DRB configuration as depicted in Table 2 can be determined based upon the IP priority and the logical channel priority according to different traffic represented by the IP priority, and the AP device can obtain the correspondence relationship between type information and a DRB configuration as depicted in Table 2 from the OAM entity or specify the correspondence relationship between type information and a DRB configuration as depicted in Table 2 directly; and moreover the type information of the IPv6 is a Traffic Class (TC) which can be mapped similarly to the Type of Service (ToS), so a repeated description thereof will be omitted here.

TABLE 2

| Type information (IP priority) | DRB configuration |
|---|---|
| 7 and 6 | Logical channel priority 3, UM and Discard Timer = 100 ms |
| 5 | Logical channel priority 4, UM and Discard Timer = 100 ms |
| 4 | Logical channel priority 5, UM and Discard Timer = 300 ms |
| 3 | Logical channel priority 6, UM and Discard Timer = 300 ms |
| 2 and 1 | Logical channel priority 7, UM and Discard Timer = 300 ms |
| 0 | Logical channel priority 8, UM and Discard Timer = 300 ms |

It shall be noted that among the respective IP priorities represented by the first 3 bits in the Type of Service (ToS), the priority 6 and the priority 7 can be used for network control data, e.g., routing; the priority 5 can be used for voice data; the priority 4 can be used for a video conference and a video stream, the priority 3 can be used for voice control data; the priority 1 and the priority 2 can be used for data traffic; and the priority 0 can be defaulted. Based upon this, the IP priorities 6 and 7 can correspond to network control signaling traffic; the IP priority 5 can correspond to streaming service (e.g., at the VoIP voice-level 1); the IP priority 4 can correspond to video traffic; the IP priority 3 can correspond to streaming traffic (e.g., at the VoIP voice-level 2); the IP priorities 1 and 2 can correspond to background high best-to-effort traffic; and the IP priority 0 can correspond to background low traffic. The categorization above can also vary with the development of traffic classes.

The high or low logical channel priority in the DRB configuration can be mapped to an IP data packet at a different IP priority according to the correspondence relationship between type information and a DRB configuration as depicted in Table 2 to thereby schedule a different DRB at a different priority so as to guarantee a required QoS of the different DRB.

In the case that the correspondence relationship between type information and a DRB configuration is determined based upon the IP priority in the type information, the ToS bit information in the type information and the logical channel priority in the DRB configuration, taking the IPv4 as an example, the type information is a Type of Service (ToS), and there are 3 bits for representing an IP priority, 4-bit ToS bit information and 1 reserved bit (which needs to be set to 0) in the Type of Service (ToS); and the 4-bit ToS bit information represents the lowest delay D, the highest throughput T, the highest reliability R and the lowest cost C respectively; and since the lowest cost C is not taken into account for an air interface bearer, a correspondence relationship between type information and a DRB configuration as depicted in Table 3 can be determined based upon the IP priority, the ToS bit information (including the lowest delay D, the highest throughput T and the highest reliability R) and the logical channel priority, and the AP device can obtain the correspondence relationship between type information and a DRB configuration as depicted in Table 3 from the OAM entity or specify the correspondence relationship between type information and a DRB configuration as depicted in Table 3 directly; and moreover the type information of the IPv6 is a Traffic Class (TC) which can be mapped similarly to the Type of Service (ToS), so a repeated description thereof will be omitted here.

TABLE 3

| Type information (IP priority)/ first 3 bits of ToS | DRB configuration |
|---|---|
| 7 and 6 | Logical channel priority 3, UM mode and Discard Timer = 100 ms |
| 5/010 | Logical channel priority 4, UM and Discard Timer = 100 ms |
| 5/100 or 000 | Logical channel priority 5, UM and Discard Timer = 100 ms |
| 4/100 | Logical channel priority 6, UM and Discard Timer = 100 ms |
| 4/010 | Logical channel priority 7, UM and Discard Timer = 150 ms |
| 4/000 | Logical channel priority 8, UM and Discard Timer = 300 ms |
| 3 | Logical channel priority 9, UM and Discard Timer = 300 ms |
| 2 and 1 | Logical channel priority 10, UM and Discard Timer = 300 ms |
| 0 | Logical channel priority 8, UM and Discard Timer = 300 ms |

It shall be noted that the IP priorities 6 and 7 can correspond to network control signaling traffic; the IP priority 5 and the lowest delay D, the highest throughput T and the highest reliability R being 010 can correspond to traffic with a required high throughput at the VoIP voice-level 1; the IP priority 5 and the lowest delay D, the highest throughput T and the highest reliability R being 100 or 000 can correspond to normal traffic at the VoIP voice-level 1; the IP priority 4 and the lowest delay D, the highest throughput T and the highest reliability R being 100 can correspond to video traffic with a required low delay, the IP priority 4 and the lowest delay D, the highest throughput T and the highest reliability R being 010 can correspond to normal video traffic; the IP priority 4 and the lowest delay D, the highest throughput T and the highest reliability R being 000 can correspond to video streaming (bufferable) traffic; the IP priority 3 can correspond to streaming traffic (e.g., at the VoIP voice-level 2); the IP priorities 1 and 2 can correspond to background high best-to-effort traffic; and the IP priority 0 can correspond to background low traffic. The categorization above can also vary with the development of traffic classes.

The high or low logical channel priority in the DRB configuration can be mapped to an IP data packet at a different IP priority and with different ToS bit information according to the correspondence relationship between type information and a DRB configuration as depicted in Table 3 to thereby schedule a different IP packet at a different priority so as to guarantee a required QoS of the different IP packet.

Alternatively a different IP packet can be mapped onto a different DRB according to the correspondence relationship between type information represented by a protocol type, a source port number and a destination port number in an IPv4 data packet, or type information represented by a next header, a source port number and a destination port number in an IPv6 data packet, and a DRB configuration. For example, an IPv4 data packet including a protocol type of TCP and both source and destination port numbers being 80 (a Hypertext Server) corresponds to the DRB configuration in which the logical channel priority is 8, the mode is the UM and the discarder timer is 300 ms; and an IPv4 data packet including a protocol type of UDP and both source and destination port numbers being 2339 (a Voice Spy) corresponds to the DRB configuration in which the logical channel priority is 7, the mode is the UM and the discarder timer is 300 ms; and for some temporarily allocated port number, an IP data packet including that port number is mapped onto a default DRB to thereby accommodate a required QoS of the different IP data packet.

In the step 2, the AP device sets up the DRB for the UE using the DRB configuration, determines the DRB identifier corresponding to the setup DRB and determines the correspondence relationship between the DRB configuration and the DRB identifier particularly as follows: since the DRB needs to be distinguished by a DRBi (i.e., a DRB identifier) and the DRB includes PDCP, RLC, logical channel configuration and other information, the DRB identifier can be allocated to the setup DRB and the correspondence relationship between a DRB configuration and a DRB identifier can be determined after the DRB is sets up for the UE using the DRB configuration. For example, after the UE is connected to the AP device and successfully authenticated, the AP device needs to set up the DRB for the UE using the DRB configuration (the logical channel priority 3, the UM and the discarder timer=100 ms) and allocates the DRB identifier 1 to the setup DRB, and based upon this, there is a correspondence relationship between the DRB configuration (the logical channel priority 3, the UM and the discarder timer=100 ms) and the DRB identifier 1 for the UE.

In the step 3, the AP device determines the correspondence relationship between type information and a DRB identifier from the correspondence relationship between the type information and the DRB configuration and the correspondence relationship between a DRB configuration and a DRB identifier particularly as follows: the correspondence relationship between the type information and the DRB identifier can be determined from the correspondence relationship between the type information and the DRB configuration obtained in the step 1 and the correspondence relationship between a DRB configuration and a DRB identifier obtained in the step 2. For example, when the correspondence relationship between the type information (the IP priorities 6 and 7) and the DRB configuration (the logical channel priority 3, the UM and the discarder timer=100 ms) and the correspondence relationship between the DRB configuration (the logical channel priority 3, the UM and the discarder timer=100 ms) and the DRB identifier 1 are obtained, the correspondence relationship (the IP priorities 6 and 7) between the type information and the DRB identifier 1 can be determined. There is a correspondence relationship between type information and a DRB identifier as depicted in Table 4.

TABLE 4

| Type information (IP priority) | DRB identifier |
| --- | --- |
| 5 | 1 |
| 4 | 2 |
| 3 | 3 |
| 2 and 1 | 4 |
| 0 | 5 |

(2) The AP device notifies the UE of the correspondence relationship between type information and a DRB identifier particularly as follows: when the AP device establishes the DRB for the UE using the DRB configuration, the AP device transmits the DRB identifier corresponding to the established DRB and the type information to the UE in a Radio Resource Control (RRC) Connection Reconfigure message; or the AP device transmits the correspondence relationship between type information and a DRB identifier maintained for the UE to the UE after determining the correspondence relationship between type information and a DRB identifier.

In the process in which the AP device transmits the DRB identifier corresponding to the setup DRB and the type information to the UE over an RRC Connection Reconfigure message, since the AP device can maintain a correspondence relationship between type information and a DRB identifier for a connected UE dependent upon the setup condition of the DRB, when the UE is connected to the AP device, the AP device can transmit the DRB identifier corresponding to the setup DRB and the type information to the UE in an RRC Connection Reconfigure message for each setup DRB (including DRB identifier, PDCP, RLC, logical channel configuration parameter and other information).

For example, if the AP device needs to set up a new DRB with a DRBi 1 and at a corresponding ToS value (IP priority) being 5 via the air interface for the UE, then an RRC Connection Reconfigure message can be issued by carrying the corresponding ToS value (the IP priority 5) in addition to the DRB1 and the corresponding PDCP, RLC and logical channel configuration; and the UE can maintain a correspondence relationship between the ToS value (the IP priority 5) and the DRB1 upon reception of the RRC Connection Reconfigure message; and furthermore the AP device can maintain the correspondence relationship between the ToS value (the IP priority 5) and the DRB1 for the UE upon reception of an RRC Connection Reconfigure Success message.

In the process in which the AP device transmits the correspondence relationship between type information and a DRB identifier maintained for the UE to the UE, since the AP device can maintain a correspondence relationship between type information and a DRB identifier for a connected UE dependent upon the setup condition of the DRB, the AP device can transmit the correspondence relationship between type information and a DRB identifier maintained for the UE directly to the UE in a new signaling message after the AP device maintains the correspondence relationship between type information and a DRB identifier for the UE dependent upon the setup condition of the DRB.

(3) The UE obtains the correspondence relationship between type information and a DRB identifier particularly as follows: the UE receives the correspondence relationship between type information and a DRB identifier notified of by the AP device; and particularly when the AP device configures the DRB for the UE using the DRB configuration, the UE receives, from the AP device, the RRC Connection Reconfigure message carrying the DRB identifier corresponding to the setup DRB and the type information; or the UE receives, from the AP device, the correspondence relationship between type information and a DRB identifier maintained by the AP device for the UE after the AP determines the correspondence relationship between type information and a DRB identifier.

In an embodiment of the invention, since the AP device can transmit the correspondence relationship between type information and a DRB identifier to the UE in an RRC Connection Reconfigure message or a new signaling message, the UE can obtain the correspondence relationship between type information and a DRB identifier by receiving the RRC Connection Reconfigure message or the new signaling message transmitted from the AP device. For example, if the AP device maintains the correspondence relationship between type information and a DRB identifier as depicted in Table 4, then the UE can obtain and maintain a correspondence relationship between type information and a DRB identifier as depicted in Table 5, that is, Table 5 is identical to Table 4 in contents.

TABLE 5

| Type information (IP priority) | DRB identifier |
|---|---|
| 5 | 1 |
| 4 | 2 |
| 3 | 3 |
| 2 and 1 | 4 |
| 0 | 5 |

Based upon the flows above, both the AP device and the UE maintain the corresponding correspondence relationship between type information and a DRB identifier; and particularly since all the corresponding PDCP, RLC, logical channel configuration and other information in the DRB are configured by the AP device for the UE, the AP device needs to maintain the correspondence relationship between type information and a DRB configuration (obtained from the OAM entity or prescribed in the protocol) and further determines from the correspondence relationship between type information and a DRB configuration and maintains the correspondence relationship between type information and a DRB identifier; and the UE only needs to maintain the correspondence relationship between type information and a DRB identifier.

In an embodiment of the invention, if the AP device needs to subsequently remove the DRB (e.g., the DRB1) of the UE, then the correspondence relationship between the ToS value (the IP priority 5) and the DRB1 maintained at the UE side and the AP device side also needs to be removed correspondingly.

In a second implementation, the AP device and the UE prescribe the correspondence relationship between type information and a DRB identifier directly, for example, by prescribing the correspondence relationship between type information and a DRB configuration directly in the protocol.

In an embodiment of the invention, for an invariable correspondence relationship between type information and a DRB identifier, the correspondence relationship between type information and a DRB identifier can be prescribed directly at both the AP device and UE sides in a predefined manner; and since all the corresponding PDCP, RLC, logical channel configuration and other information in the DRB are configured by the AP device for the UE, the AP device needs to prescribe the correspondence relationship between type information and a DRB configuration in addition to the correspondence relationship between type information and a DRB identifier. Based upon this, the AP device can maintain a correspondence relationship between type information, a DRB configuration and a DRB identifier as depicted in Table 6, and the UE can maintain a correspondence relationship between type information and a DRB identifier as depicted in Table 7.

TABLE 6

| Type information (IP priority) | DRB configuration | DRB identifier |
|---|---|---|
| 5 | UM, Discard Timer = 100 ms and logical channel priority 3 | 1 |
| 4 | AM, Discard Timer = 300 ms and logical channel priority 4 | 2 |
| 3 | AM, Discard Timer = 300 ms and logical channel priority 5 | 3 |
| 2 and 1 | UM, Discard Timer = 300 ms and logical channel priority 6 | 4 |
| 0 | UM, Discard Timer = 300 ms and logical channel priority 7 | 5 |

TABLE 7

| Type information (IP priority) | DRB identifier |
|---|---|
| 5 | 1 |
| 4 | 2 |
| 3 | 3 |
| 2 and 1 | 4 |
| 0 | 5 |

It shall be noted that the correspondence relationship between type information, a DRB configuration and a DRB identifier depicted in Table 6 above can be determined based upon the IP priority in the type information and the logical channel priority in the DRB configuration; or can be determined based upon the IP priority in the type information, the ToS bit information in the type information (e.g., the lowest delay D, the highest throughput T and the highest reliability R) and the logical channel priority in the DRB configuration. Of course a practical application will not be limited to these two schemes as long as the correspondence relationship between type information, a DRB configuration and a DRB identifier can be determined based upon the 8-bit information in the Type of Service (ToS) or the Traffic Class (TC). Moreover the type information can alternatively be a protocol type, a source port number and a destination port number in an IPv4 data packet or a next header, a source port number and a destination port number in an IPv6 data packet.

Moreover when the AP device sets up the DRB for the UE using the DRB configuration, the AP device needs to allocate the DRB identifier for the setup DRB according to the correspondence relationship between type information, a DRB configuration and a DRB identifier as depicted in Table 6. For example, when the DRB is set up for the UE using the DRB configuration (the logical channel priority 3, the UM and the discard timer=100 ms), the DRB identifier 1 needs to be allocated for the setup DRB.

Second Embodiment

Figure 6:
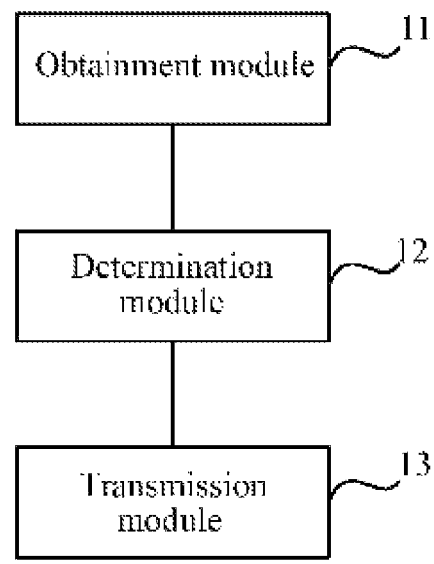
FIG. 6 is a schematic structural diagram of an AP device according to a second embodiment of the invention.

Based upon the same inventive idea as the method above, an embodiment of the invention further provides an Access Point (AP) device, and as illustrated in FIG. 6, the AP device includes:

An obtainment module 11 is configured to obtain an IP data packet to be transmitted to a UE;

A determination module 12 is configured to determine, from type information of the IP data packet, a Data Radio Bearer (DRB) corresponding to the IP data packet; and A transmission module 13 is configured to transmit the IP data packet to the UE over the DRB.

The determination module 12 is particularly configured to inquire about a DRB identifier corresponding to the type information of the IP data packet from a pre-maintained correspondence relationship between type information and a DRB identifier and to determine the DRB corresponding to the IP data packet by the DRB identifier.

The determination module 12, when configured to maintain the correspondence relationship between type information and a DRB identifier, is further configured to obtain a correspondence relationship between type information and a DRB configuration; and when the UE is connected to the AP device, to set up the DRB for the UE using a DRB configuration, to determine a DRB identifier corresponding to the setup DRB and to determine a correspondence relationship between a DRB configuration and a DRB identifier; and to determine the correspondence relationship between type information and a DRB identifier from the correspondence relationship between type information and a DRB configuration and the correspondence relationship between a DRB configuration and a DRB identifier; or to prescribe the correspondence relationship between type information and a DRB identifier directly with the UE.

The determination module 12, when configured to obtain the correspondence relationship between type information and a DRB configuration, is further configured to obtain the correspondence relationship between type information and a DRB configuration from an Operation Administration and Maintenance (OAM) entity; or to obtain the correspondence relationship between type information and a DRB configuration in a predefined manner.

In an embodiment of the invention, the correspondence relationship between type information and a DRB configuration is particularly a correspondence relationship between type information and a DRB configuration determined based upon an IP priority in the type information and a logical channel priority in the DRB configuration; or a correspondence relationship between type information and a DRB configuration determined based upon an IP priority in the type information, TOS bit information in the type information and a logical channel priority in the DRB configuration, where the TOS bit information in the type information is the lowest delay D, the highest throughput T and the highest reliability R.

In an embodiment of the invention, the transmission module 13 is further configured to transmit the DRB identifier corresponding to the setup DRB and the type information to the UE in a Radio Resource Control (RRC) Connection Reconfigure message when the DRB is set up for the UE using the DRB configuration; or to transmit the correspondence relationship between type information and a DRB identifier maintained for the UE to the UE after the correspondence relationship between type information and a DRB identifier is determined.

In an embodiment of the invention, the transmission module 13 is further configured to remove the correspondence relationship between type information and a DRB identifier corresponding to the UE and instruct the UE to remove the correspondence relationship between type information and a DRB identifier corresponding to the UE when the DRB of the UE needs to be removed after the correspondence relationship between type information and a DRB identifier is determined from the correspondence relationship between type information and a DRB configuration and the correspondence relationship between a DRB configuration and a DRB identifier.

In an embodiment of the invention, the type information is particularly a Type of Service (ToS) carried in a header of an IPv4 data packet; or a Traffic Class (TC) carried in a header of an IPv6 data packet; or a protocol type, a source port number and a destination port number in the IPv4 data packet; or a next header, a source port number and a destination port number in the IPv6 data packet.

In an embodiment of the invention, the AP is connected with an IP network via an IP interface and transmits the IP data packet to the UE via an air interface.

Where the respective modules in the device according to the invention can be integrated together or can be deployed separately. The modules above can be integrated into a single module or can be subdivided into a plurality of sub-modules.

Third Embodiment

Figure 7:
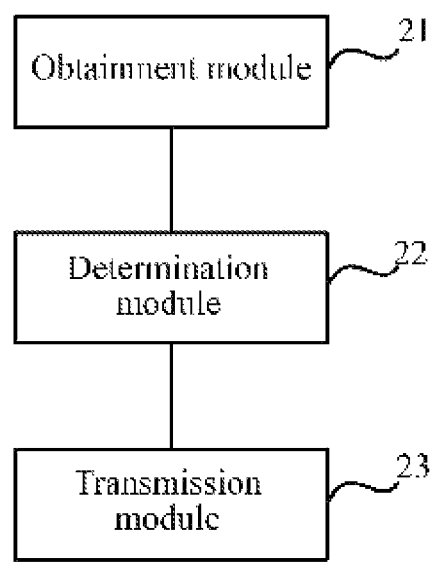
FIG. 7 is a schematic structural diagram of a user equipment according to a third embodiment of the invention.

Based upon the same inventive idea as the method above, an embodiment of the invention further provides a User Equipment (UE), and as illustrated in FIG. 7, the UE includes:

An obtainment module 21 is configured to obtain an IP data packet to be transmitted to an Access Point (AP) device;

A determination module 22 is configured to determine, from type information of the IP data packet, a Data Radio Bearer (DRB) corresponding to the IP data packet; and A transmission module 23 is configured to transmit the IP data packet to the AP device over the DRB.

The determination module 22 is particularly configured to inquire about a DRB identifier corresponding to the type information of the IP data packet from a pre-maintained correspondence relationship between type information and a DRB identifier and to determine the DRB corresponding to the IP data packet by the DRB identifier.

The determination module 22, when configured to maintain the correspondence relationship between type information and a DRB identifier, is further configured to further receive and maintain the correspondence relationship between type information and a DRB identifier notified of by the AP device; or to prescribe the correspondence relationship between type information and a DRB identifier directly with the AP device.

The determination module 22, when configured to receive the correspondence relationship between type information and a DRB identifier notified of by the AP device, is further configured to receive a Radio Resource Control (RRC) Connection Reconfigure message carrying the DRB identifier corresponding to the setup DRB and the type information from the AP device when the AP device sets up the DRB for the UE using a DRB configuration; or to receive the correspondence relationship between type information and a DRB identifier maintained by the AP device for the UE from the AP device after the AP device determines the correspondence relationship between type information and a DRB identifier.

In an embodiment of the invention, the determination module 22 is further configured to remove the correspondence relationship between type information and a DRB identifier corresponding to the UE upon reception of an instruction from the AP device to remove the correspondence relationship between type information and a DRB identifier corresponding to the UE after receiving and maintaining the correspondence relationship between type information and a DRB identifier notified of by the AP device.

In an embodiment of the invention, the type information is particularly a Type of Service (ToS) carried in a header of an IPv4 data packet; or a Traffic Class (TC) carried in a header of an IPv6 data packet; or a protocol type, a source port number and a destination port number in the IPv4 data packet; or a next header, a source port number and a destination port number in the IPv6 data packet.

Where the respective modules in the device according to the invention can be integrated together or can be deployed separately. The modules above can be integrated into a single module or can be subdivided into a plurality of sub-modules.

Those skilled in the art can clearly appreciate from the foregoing description of the embodiments that the embodiments of the invention can be implemented in software plus a necessary general hardware platform or, of course, in hardware, although the former implementation is preferred in many cases. Based upon such understanding, the technical solutions of the embodiments of the invention in essence or the part thereof contributing to the prior art can be embodied in the form of a software product which can be stored in a storage medium and which includes several instructions to cause a terminal device (e.g., a personal computer, a server, a network device, etc.) to perform the methods according to the respective embodiments of the invention.

Those skilled in the art can appreciate that the drawings are merely a schematic diagram of preferred embodiments, and the module(s) or the flow(s) may not necessarily be required to implement the embodiments of the invention.

Those skilled in the art can appreciate that the modules in the apparatuses of the embodiments can be distributed in the apparatuses of the embodiments as described in the embodiments or located in one or more apparatuses different from those of the embodiments given corresponding variations. The modules of the foregoing embodiments can be integrated together or deployed separately or can be combined into one module or further subdivided into a plurality of sub-modules.

The embodiments of the invention have been numbered only for the sake of a convenient description but will not suggest any superiority or inferiority of one embodiment to another.

The foregoing disclosure is merely illustrative of several embodiments of the invention, but the invention will not be limited thereto, and any variations that can occur to those skilled in the art shall fall into the scope of the invention.

The invention claimed is:

1. A method for transmitting an Internet Protocol (IP) data packet, comprising:
    obtaining, by an Access Point (AP) device, an IP data packet to be transmitted to a User Equipment (UE);
    determining, by the AP device, a Data Radio Bearer (DRB) corresponding to the IP data packet from type information of the IP data packet; and
    transmitting, by the AP device, the IP data packet to the UE over the DRB;
    wherein determining, by the AP device, the DRB corresponding to the IP data packet from type information of the IP data packet comprises:
    inquiring, by the AP device, about a DRB identifier corresponding to the type information of the IP data packet from a pre-maintained correspondence relationship between the type information and the DRB identifier and determining the DRB corresponding to the IP data packet by the DRB identifier;
    wherein maintaining, by the AP device, the correspondence relationship between the type information and the DRB identifier comprises:
    obtaining, by the AP device, a correspondence relationship between the type information and a DRB configuration; when the UE is connected to the AP device, setting up the DRB for the UE using the DRB configuration, creating a correspondence relationship between the DRB configuration and the DRB identifier and allocating the DRB identifier to the setup DRB; and determining the correspondence relationship between the type information and the DRB identifier from the correspondence relationship between the type information and the DRB configuration and the correspondence relationship between the DRB configuration and the DRB identifier;
    wherein the method further comprises:
    transmitting, by the AP device, the correspondence relationship between the type information and the DRB identifier maintained for the UE to the UE after determining the correspondence relationship between the type information and the DRB identifier.

2. The method according to claim 1, wherein obtaining, by the AP device, the correspondence relationship between the type information and the DRB configuration comprises:
    obtaining, by the AP device, the correspondence relationship between the type information and the DRB configuration from an Operation Administration and Maintenance (OAM) entity; or
    obtaining, by the AP device, the correspondence relationship between the type information and the DRB configuration in a predefined manner.

3. The method according to claim 1, after the AP device determines the correspondence relationship between the type information and the DRB identifier from the correspondence relationship between the type information and the DRB configuration and the correspondence relationship between the DRB configuration and the DRB identifier, further comprising:
    when the AP device needs to remove the DRB of the UE, removing, by the AP device, the correspondence relationship between the type information and the DRB identifier corresponding to the UE and instructing the UE to remove the correspondence relationship between the type information and the DRB identifier corresponding to the UE.

4. The method according to claim 1, wherein the type information is particularly a Type of Service (ToS) carried in a header of an IPv4 data packet; or a Traffic Class (TC) carried in a header of an IPv6data packet; or a protocol type, a source port number and a destination port number in the IPv4 data packet; or a next header, a source port number and a destination port number in the IPv6 data packet.

5. The method according to claim 1, wherein the AP device is connected with an IP network via an IP interface and transmits the IP data packet to the UE via an air interface.

6. A method for transmitting an Internet Protocol (IP) data packet, comprising:
    obtaining, by a User Equipment (UE) an IP data packet to be transmitted to an Access Point (AP) device;
    determining, by the UE, a Data Radio Bearer (DRB) corresponding to the IP data packet from type information of the IP data packet; and
    transmitting, by the UE, the IP data packet to the AP device over the DRB;
    wherein determining, by the UE, the DRB corresponding to the IP data packet from the type information of the IP data packet comprises:
    inquiring, by the UE, about a DRB identifier corresponding to the type information of the IP data packet from a pre-maintained correspondence relationship between the type information and the DRB identifier and determining the DRB corresponding to the IP data packet by the DRB identifier;

wherein maintaining, by the UE, the correspondence relationship between the type information and the DRB identifier comprises:
receiving and maintaining, by the UE, the correspondence relationship between the type information and the DRB identifier notified of by the AP device;
wherein receiving, by the UE, the correspondence relationship between the type information and the DRB identifier notified of by the AP device comprises:
receiving, by the UE, the correspondence relationship between the type information and the DRB identifier maintained by the AP device for the UE from the AP device after the AP device determines the correspondence relationship between the type information and the DRB identifier.

7. The method according to claim 6, after the UE receives and maintains the correspondence relationship between the type information and the DRB identifier notified of by the AP device, further comprising:
removing, by the UE, the correspondence relationship between the type information and the DRB identifier corresponding to the UE when the UE receives an instruction from the AP device to remove the correspondence relationship between the type information and the DRB identifier corresponding to the UE.

8. The method according to claim 6, wherein the type information is particularly a Type of Service (ToS) carried in a header of an IPv4 data packet; or a Traffic Class (TC) carried in a header of an IPv6 data packet; or a protocol type, a source port number and a destination port number in the IPv4 data packet; or a next header, a source port number and a destination port number in the IPv6 data packet.

9. An Access Point (AP) device, comprising a memory and a processor, wherein the memory is configured to store codes of a computer program and the processor is configured to execute the computer program to:
obtain an Internet Protocol (IP) data packet to be transmitted to a User Equipment (UE);
determine a Data Radio Bearer (DRB) corresponding to the IP data packet from type information of the IP data packet; and
transmit the IP data packet to the UE over the DRB;
wherein the processor configured to determine the DRB corresponding to the IP data packet from the type information of the IP data packet is configured to:
inquire about a DRB identifier corresponding to the type information of the IP data packet from a pre-maintained correspondence relationship between the type information and the DRB identifier and determine the DRB corresponding to the IP data packet by the DRB identifier;
wherein the processor configured to maintain the correspondence relationship between the type information and the DRB identifier is further configured to:
obtain a correspondence relationship between the type information and a DRB configuration; when the UE is connected to the AP device, set up the DRB for the UE using a DRB configuration, create a correspondence relationship between the DRB configuration and the DRB identifier and allocate the DRB identifier to the setup DRB; and determine the correspondence relationship between the type information and the DRB identifier from the correspondence relationship between the type information and the DRB configuration and correspondence relationship between the DRB configuration and the DRB identifier;

wherein the processor is further configured to transmit the correspondence relationship between the type information and the DRB identifier maintained for the UE to the UE after the correspondence relationship between the type information and the DRB identifier is determined.

10. The AP device according to claim 9, wherein the processor configured to obtain the correspondence relationship between the type information and the DRB configuration is further configured to:
obtain the correspondence relationship between the type information and the DRB configuration from an Operation Administration and Maintenance (OAM) entity; or
obtain the correspondence relationship between the type information and the DRB configuration in a predefined manner.

11. The AP device according to claim 9, wherein the processor is further configured to:
remove the correspondence relationship between the type information and the DRB identifier corresponding to the UE and instruct the UE to remove the correspondence relationship between the type information and the DRB identifier corresponding to the UE when the DRB of the UE needs to be removed after the correspondence relationship between the type information and the DRB identifier is determined from the correspondence relationship between the type information and the DRB configuration and the correspondence relationship between the DRB configuration and the DRB identifier.

12. The AP device according to claim 9, wherein the type information is particularly a Type of Service (ToS) carried in a header of an IPv4 data packet; or a Traffic Class (TC) carried in a header of an IPv6 data packet; or a protocol type, a source port number and a destination port number in the IPv4 data packet; or a next header, a source port number and a destination port number in the IPv6 data packet.

13. A User Equipment (UE), comprising a memory and a processor, wherein the memory is configured to store codes of a computer program and the processor is configured to execute the computer program to:
obtain an Internet Protocol (IP) data packet to be transmitted to an Access Point (AP) device;
determine a Data Radio Bearer (DRB) corresponding to the IP data packet from type information of the IP data packet; and
transmit the IP data packet to the AP device over the DRB;
wherein the processor configured to determine the DRB corresponding to the IP data packet from the type information of the IP data packet is configured to:
inquire about a DRB identifier corresponding to the type information of the IP data packet from a pre-maintained correspondence relationship between the type information and the DRB identifier and determine the DRB corresponding to the IP data packet by the DRB identifier;
wherein the processor configured to maintain the correspondence relationship between the type information and the DRB identifier is configured to:
receive and maintain the correspondence relationship between the type information and the DRB identifier notified of by the AP device;
wherein the processor configured to receive the correspondence relationship between the type information and the DRB identifier notified of by the AP device is configured to:

receive the correspondence relationship between type information and a DRB identifier maintained by the AP device for the UE from the AP device after the AP device determines the correspondence relationship between type information and a DRB identifier.

14. The UE according to claim 13, wherein the processor is further configured to remove the correspondence relationship between the type information and the DRB identifier corresponding to the UE upon reception of an instruction from the AP device to remove the correspondence relationship between the type information and the DRB identifier corresponding to the UE after receiving and maintaining the correspondence relationship between the type information and the DRB identifier notified of by the AP device.

* * * * *